United States Patent Office 3,728,159
Patented Apr. 17, 1973

3,728,159
ELECTROCHEMICAL CELL WITH MODIFIED CRYSTALLINE DISULFIDE ELECTROCATALYSTS
Gideon M. Varga, Jr., Ho-Ho-Kus, N.J., assignor to Esso Research and Engineering Company, Linden, N.J.
No Drawing. Filed June 4, 1971, Ser. No. 150,229
Int. Cl. H01m 27/04
U.S. Cl. 136—86 D
7 Claims

ABSTRACT OF THE DISCLOSURE

An electrochemical cell is improved when at least catalytic amounts of a modified crystalline disulfide of a Group VI-B metal is used as an electrocatalyst. The metal disulfide is modified with from 1 to 10 mole percent of a lower altervalent atom. The electrocatalyst can be used as an anode or cathode catalyst.

BACKGROUND OF THE INVENTION

The present invention concerns non-noble metal electrocatalysts. In general, it relates to modified crystalline disulfide transition metal catalysts for use in electrochemical cells. More particularly, the electrocatalysts of the present invention relate to specially modified crystalline disulfides of Group VI-B of the Periodic Table of the Elements characterized by superior catalyst activity.

As used herein, the term "electrochemical cells" refers both to fuel cells and electrolytic cells. The term "fuel cell" is used herein and in the art, to denote a device, system or apparatus wherein the chemical energy of the fluid combustible fuel is electrochemically converted to electric energy in a non-sacrificial or inert electrode. The true fuel cell is adapted for continuous operation and is supplied with both fuel and oxygen from sources outside the cell proper. Such cells include at least two non-sacrificial or inert electrodes functioning as an anode or cathode respectively. Disposed between the anode and the cathode is an electrolyte which provides ionic conductance between the electrodes. Conductive means are provided for electrode connection between the anode and the cathode external the electrolyte. Also, means are provided for admitting fluid fuel in contact with the anode and electrolyte and means for admitting a fluid oxidant into dual contact with the cathode and the electrolyte. When necessary or desired the electrolyte compartment is divided into an anolyte compartment and a catholyte compartment, for example, by ion permeable partition or ion exchange membrane. Thus, in each fuel cell the fluid fuel is passed to the anode and there oxidized electrochemically giving up electrons to the anode while a fluid oxidant is passed to the cathode and there reduced upon receiving electrons from such cathode. When current is withdrawn, there is a net flow of electrons from the fuel electrode to the external circuit to the oxygen electrode.

The term "electrolytic cell" is used herein and in the art to denote a device or apparatus which unlike the aforementioned fuel cell does not provide a net production of electrical energy but does provide for the anodic oxidation of a fluid organic fuel at the anode. In such cells a direct current of electrical energy from an external source, for example, a fuel cell, a storage battery, or an alternating current rectifier is admitted to the electrical circuit to provide electrons to the cathode. These cells evolve hydrogen from an aqueous electrolyte and water is added to the cell while the cell is in operation. Such cells can be used for electrochemical production of various organic chemicals such as the conversion of alcohols to ketones, the conversion of hydrocarbons to carboxylic acids and the like.

In most cells of the type hereinbefore described, catalysts are employed to promote the reactions within the cell. The term "cathodic reduction catalysts" is employed herein to include catalysts which are associated with the cathode reaction. The term "anodic oxidation catalyst" is employed herein to include catalysts which are associated with the anode reaction. These catalysts usually are an integral part of the cathode or anode but in some applications the catalysts are not a part of the electrode. For example, the catalysts may be employed in the form of an electrode slurry.

In addition to exhibiting electrode catalytic activity a material to be suitable for use as such a catalyst in an electrochemical cell must also exhibit certain other properties. For example, material must be electrically conductive and in addition must be resistant to attack from the electrolyte within the cell. Many cells employ acidic electrolytes since such electrolytes reject carbon dioxide. Thus the material which is conductive must also be resistant to acid corrosion. In order for the material to be a suitable electrocatalyst many other practical criteria must also be met. For example, for commercial acceptability the catalytic material must be relatively inexpensive. Moreover, the development of electrocatalysts has been largely empirical in nature. Consequently, despite many of the recent advantages in the electrochemical art the research still continues for new and improved electrocatalysts.

SUMMARY OF THE INVENTION

According to the present invention electrocatalysts having superior activity are provided. These electrocatalysts comprise a modified crystalline disulfide of a metal selected from Group VI-B of the Periodic Table of the Elements, in which metal disulfide, from one to ten percent of the metal atoms is replaced with atoms of lower altervalent metals. For the purpose of this invention the Periodic Table referred to its that described in "Encyclopedia of Chemistry" Reinhold Publishing Corporation, 2nd edition (1966) at page 790. Altervalent metals of course, include such metals as iron, cobalt, nickel, copper, lithium, gallium and the like.

In one aspect of the present invention, a new and improved electrochemical cell is provided in which at least one electrode contains at least catalytic amounts of the previously described modified crystalline disulfide.

In a preferred embodiment of the present invention an electrocatalyst is crystalline molybdenum disulfide modified with cobalt.

DETAILED DESCRIPTION OF THE PREFERRED EMBODIMENTS

It has been found that a crystalline disulfide metal selected from Group VI-B of the Periodic Table of the Elements, when modified by replacing 1 to 10 mole percent of the metal atoms in the disulfide with lower altervalent atoms produces an electrocatalyst of superior activity. Preferably the modified disulfide is molybdenum disulfide and the altervalent metal is cobalt. As previously mentioned, however, other altervalent metals such as iron, nickel, copper, lithium and gallium may be employed.

It is to be emphasized however, that the crystalline material of the modified disulfide is preserved though altervalent metal atoms are present in the crystalline material. Should excess number of altervalent atoms be introduced so as to destroy the crystalline structure of the disulfide the beneficial catalytic activity will be impaired. To prepare a modified crystalline disulfide of the Group VI–B metals, a Group VI–B metal trisulfide is first impregnated with an aqueous solution of a soluble compound of an altervalent metal in an amount such that the atomic ratio of the altervalent metal of the aqueous solution to the metal of the trisulfide is not more than 0.1. It has been observed that when the trisulfide is impregnated with an aqueous solution of a cobalt salt, for example, in an amount sufficient to provide an atomic ratio of altervalent metal to the metal of the trisulfide, the crystalline trisulfide structure is sufficiently distorted to permit dissolution of the altervalent metal. Consequently, atomic ratios of altervalent metal to metal of the trisulfide in the range of about 0.03 to about 0.08 are preferred.

The metal trisulfide treated in the manner set forth above is dried and reduced with a gas containing hydrogen in a sulfur compound such as hydrogen sulfide. A mixture of hydrogen and hydrogen sulfide can be employed. For example, about 90 to 99 volume percent of molecular hydrogen mixed with about 10 to 1 volume percent of hydrogen sulfide is useful in reducing the catalyst of this invention.

The reduction step is conducted under temperature and pressure conditions to provide for the simultaneous reduction of the metal trisulfide to the disulfide and a replacement of from 1 to 10 mole percent of the metal atoms of this disulfide with the altervalent material. When the metal is molybdenum and the altervalent material is cobalt, the reduction step is conducted at a temperature above about 400° C., preferably the temperature is in the range of from about 400° C. to about 600° C. Under these conditions the crystalline material obtained normally has a surface area higher than that obtained if the temperature exceeds 600° C.

Inasmuch as these modified, crystalline disulfide electrocatalysts are relatively poor electrical conductors, the catalysts are normally supported on a porous electrically conductive support material. Supporting the catalyst on such a conductive support material can be achieved in a conventional manner. In general, an electrode is made by mixing the catalyst with 20% by weight of a high surface area carbon black. Such materials are available generally in the trade under the trade names of "Elftex 5," "Spheron 6," "Graphon" and "FC–30" "Elftex 5," for example, manufactured by Cabot Corporation has a surface area of about 74 m.$^2$/g.

To the carbon and electrocatalyst of the invention is then added aqueous emulsion containing from about 5 to about 10% by weight of polytetrafluoroethylene. The resultant paste is then applied at ambient temperature to a tantalum screen current collector. An electrode may then be formed by pressing at room temperature at 1000 p.s.i. and then pressing at temperatures in excess of 300° C. and 1100 p.s.i.

The following examples demonstrate the effectiveness of the electrocatalysts of this invention.

EXAMPLE 1

Electrodes containing a modified crystalline molybdenum disulfide having 5% of the molybdenum replaced with cobalt were prepared in the following manner: 18.252 grams of molybdenum trisulfide powder was impregnated with a solution of cobalt acetate so that 5% of the molybdenum atoms would be replaced by cobalt. The impregnated trisulfide was reduced at 450° C. under a stream of hydrogen sulfide for 8 hours. X-ray examination of this crystalline material showed it to have the hexagonal molybdenum disulfide structure.

In a similar manner molybdenum trisulfide was impregnated with sufficient cobalt acetate to provide a disulfide catalyst in which 10% molybdenum atoms were replaced by cobalt.

EXAMPLE 2

Electrodes were prepared using the catalyst obtained by the procedure outlined in Example 1.

To 0.8 gram of the catalyst was added 0.2 gram of high surface area carbon black and an aqueous emulsion of 10 wt. percent of polytetrafluoroethylene. The resultant paste was applied to both sides of a 50 mesh tantalum screen. The coated screen was then pressed at room temperature in a hydraulic press at a 1000 p.s.i. for about ten seconds and then at 330° C. and 1100 p.s.i. for about a minute. The electrode area was about 5.4 square centimeters.

EXAMPLE 3

Electrodes prepared in Example 2 were tested as an anode by employing hydrogen gas in contact therewith in a half cell containing 3.7 moles sulfuric acid maintained at a temperature of about 90° C. The following data were obtained using standard saturated calomel reference electrode. For comparative purposes the test was also conducted under identical conditions using a non-modified molybdenum disulfide catalyst.

TABLE I

| Catalyst | Volts polarized at indicated current density (ma./cm.$^2$) | | | | | |
|---|---|---|---|---|---|---|
| | 0 | 5 | 10 | 20 | 50 | 100 |
| MoS$_2$ | 0.02 | 0.27 | | | | |
| MoS$_2$ plus 5% Co | 0.01 | 0.022 | 0.046 | 0.115 | | |
| MoS$_2$ plus 10% Co | 0.009 | 0.01 | 0.014 | 0.026 | 0.085 | 0.302 |

EXAMPLE 4

In a manner similar to Example 3 the electrodes prepared in Example 2 were tested as cathodes by employing oxygen gas in contact therewith in a half cell containing 3.7 molar sulfuric acid maintained at a temperature of about 60° C. Results presented in the following table were obtained using a saturated calomel reference electrode.

TABLE II

| Catalyst | O$_2$ open circuit current density [1] | Current density at potential | |
|---|---|---|---|
| | | Ma./cm.$^2$ | Volts vs. oxygen theoretical |
| MoS$_2$ | 0.61 | 85 | 1.01 |
| MoS$_2$ plus 5% Co | 0.56 | 218 | 1.01 |
| MoS$_2$ plus 10% Co | 0.55 | 231 | 0.91 |

[1] Volts vs. oxygen theoretical.

What is claimed is:

1. In an electrochemical cell comprising a housing, an electrolyte and at least two electrodes of opposite polarity, the improvement wherein at least one of said electrodes contains at least catalytic amounts of a modified crystalline disulfide of a metal selected from Group VI–B of the Periodic Table of the Elements, said disulfide having from 1 to 10 mole percent of the metal atoms of the disulfide replaced with other metal atoms selected from the group consisting of iron, cobalt and nickel.

2. The cell of claim 1 wherein the metal of the modified crystalline metal disulfide is molybdenum.

3. The cell of claim 1 wherein the modified crystalline disulfide is molybdenum disulfide and the other metal atoms are cobalt.

4. In combination with an electrochemical cell which includes at least two electrodes of opposite polarity, an electrolyte disposed between said electrodes and an electrocatalyst associated with at least one of said electrodes, the improvement wherein the electrocatalyst comprises a modified crystalline disulfide of a metal selected from Group VI–B of the Periodic Table of the Elements, said disulfide having from 1 to 10 mole percent of the metal atoms of the disulfide replaced with other metal atoms selected from the group consisting of iron, cobalt and nickel.

5. The cell of claim 4 wherein the modified crystalline disulfide is molybdenum disulfide.

6. The cell of claim 5 wherein the other metal atoms are cobalt.

7. The cell of claim 4 wherein the metal of modified crystalline disulfide is tungsten.

References Cited
UNITED STATES PATENTS

| | | | |
|---|---|---|---|
| 3,198,667 | 8/1965 | Gladrow et al. | 136—122 |
| 3,573,988 | 4/1971 | McKee et al. | 136—86 D |

WINSTON A. DOUGLAS, Primary Examiner

M. J. ANDREWS, Assistant Examiner

U.S. Cl. X.R.

136—120 FC